United States Patent [19]
Misawa et al.

[11] Patent Number: 5,632,442
[45] Date of Patent: May 27, 1997

[54] ENGINE-DRIVEN HEAT PUMP APPARATUS AND METHOD FOR STABLE OPERATION OF HEAT PUMP

[75] Inventors: Makoto Misawa; Makoto Oguri, both of Iwata, Japan

[73] Assignee: Yamaha Hatsudoki Kabushiki Kaisha, Shizuoka, Japan

[21] Appl. No.: 598,373

[22] Filed: Feb. 8, 1996

[51] Int. Cl.$^6$ .................................... F25B 27/00
[52] U.S. Cl. .......................... 237/2 B; 62/228.3; 62/238.7; 163/240
[58] Field of Search ................ 62/238.6, 238.7, 62/228.3, 323.1; 237/2 B

[56] References Cited

U.S. PATENT DOCUMENTS

| | | | |
|---|---|---|---|
| 4,735,061 | 4/1988 | Hsieh | 237/2 B |
| 4,932,220 | 6/1990 | Inoue | 62/238.3 |
| 5,333,468 | 8/1994 | Rice | 62/228.3 |
| 5,363,673 | 11/1994 | Atterbury et al. | 165/240 |
| 5,457,965 | 10/1995 | Blair et al. | 62/228.3 |

*Primary Examiner*—William E. Tapolcai
*Attorney, Agent, or Firm*—Knobbe, Martens, Olson & Bear, LLP

[57] ABSTRACT

An engine-driven heat pump apparatus having a refrigerant circulation line which includes a pressure-measuring device for measuring the pressure in the refrigerant circulation line downstream of a compressor and upstream of an expansion valve, and an exhaust heat controller for controlling the exhaust heat from the engine based on the pressure by, for example, changing the heat efficiency of the engine, e.g., by controlling at least one of (a) the ignition timing of the engine, (b) the opening and closing timing of an intake port valve and an exhaust port valve, and (c) the opening of a fuel gas-controlling valve, so as to efficiently increase heating power during heating operation at low temperatures, without increasing engine noise or shortening the life of the engine.

13 Claims, 7 Drawing Sheets

ENGINE-DRIVEN HEAT PUMP APPARATUS AND METHOD FOR STABLE OPERATION OF HEAT PUMP

BACKGROUND

1. Field of the Invention

This invention relates to an engine-driven heat pump apparatus, for heating or cooling the air in a room, comprising an inside heat-exchanger installed in the room and an outside heat-exchanger installed outside the room, and, in particular, to such an apparatus with the use of exhaust heat from the engine to compensate for insufficient heat of evaporation. In addition, this invention relates to a method for stable operation of an engine-driven heat pump, in which exhaust heat from the engine is used to compensate for insufficient heat of evaporation, thereby stabilizing operation of the heat pump, especially in the heating mode during cold weather.

2. Background of the Art

A heat pump apparatus functions as a heater and a cooler by switching the flow of the refrigerant. That is, an inside heat-exchanger functions as a condenser for heating the room while it functions as an evaporator for cooling the room. An outside heat-exchanger functions in the opposite way. A problem in operating the heat pump apparatus is an insufficient heating power (or heating capacity) during cold weather. This problem will be explained with reference to a basic cycle of an engine-driven heat pump apparatus depicted and a p-i chart (pressure and enthalpy chart).

FIG. 8 shows a basic cycle of an engine-driven heat pump apparatus in the heating mode, and FIG. 9 shows a p-i chart of the basic cycle of the engine-driven heat pump apparatus.

When a compressor 2 is driven by an engine 1, a vaporized refrigerant in a state (pressure $P_1$ and enthalpy $i_1$) marked (1) in FIG. 9 is compressed in the compressor 2 and changed to a state (pressure $P_2$ and enthalpy $i_2$) marked (2) in FIG. 9, in which the refrigerant is under a high pressure with a high temperature. The power of the compressor 2 necessary to cause the change per unit weight of the refrigerant (the quantity of heat for compression), AL, is expressed as $(i_2-i_1)$.

The refrigerant under a high pressure with a high temperature is introduced to an inside heat-exchanger 39 functioning as a condenser, and liquefied therein as a result of radiating heat of condensation $Q_2$ to the air in a room. The liquefied refrigerant, after passing through the inside heat-exchanger 39, is in a state (pressure $P_2$ and enthalpy $i_3$) marked (3) in FIG. 9, in which the refrigerant is sub-cooled as a result of radiated heat $Q_2$ (i.e., $i_2-i_3$) which heats the interior of the room.

The liquefied refrigerant in a state marked (3) subsequently undergoes reduction of pressure due to an expansion valve 40, and is changed to a state (pressure $P_1$ and enthalpy $i_3$) marked (4) in FIG. 9, in which a portion of the refrigerant is vaporized. The partially vaporized refrigerant is then introduced to an outside heat-exchanger 42 functioning as an evaporator.

Meanwhile, a cooling water, which circulates in a cooling water line via a water pump 35, absorbs exhaust heat from the engine 1 through an exhaust gas heat-exchanger 27 and the engine 1 itself, and exerts the absorbed heat on the refrigerant at the outside heat-exchanger 42. Thus, the refrigerant receives heat from both the outside air and the cooling water at the outside heat-exchanger 42, and vaporizes, in which process the refrigerant is superheated and returns to a state (pressure $P_1$ and enthalpy $i_1$) marked (1) in FIG. 9. After this the same operation as above is repeated. In the above, the quantity of heat $Q_1$ the refrigerant receives at the outside heat-exchanger 42 is expressed as $(i_1-i_3)$.

In the above cycle, by exerting exhaust heat from the engine 1 on the refrigerant, the temperature in the heat cycle by the refrigerant is increased, thereby improving heating power (i.e., radiated heat $Q_2$). Incidentally, a warm water, which has been heated by exhaust heat from the engine at an exhaust gas heat-exchanger, can be introduced into a warm water line passing through the liquid refrigerant inside an accumulator disposed upstream of the compressor (see Japanese patent laid-open Hei 5-180529/1993).

In the above, the lower the temperature in the room the higher the heating power required; however, when the temperature in the room is low, the temperature of the outside air is normally low, and when the temperature of the outside air is too low, the refrigerant passing through the outside heat-exchanger functioning as an evaporator cannot absorb sufficient heat from the outside air, i.e., short of heat of evaporation, thereby abating heating power. Thus, when the temperature of the outside air is low, a fan for enhancing heat-exchange between the cooling water and the refrigerant is stopped, and heat of evaporation is compensated for by exhaust heat from the engine through the cooling water. However, the exhaust heat from the engine is not sufficient when the temperature of the air inside or outside the room is too low.

SUMMARY OF THE INVENTION

The present invention has exploited an engine-driven heat pump apparatus for heating and cooling a room, especially heating the room when the temperature of the air inside or outside the room is low. An objective of the present invention is to provide an engine-driven heat pump apparatus and a method for stable operation of an engine-driven heat pump apparatus which allow for efficiently compensating for insufficient heat of evaporation, especially in the heating mode during cold weather, without any drawbacks.

Namely, one important aspect of the present invention is an engine-driven heat pump apparatus comprising a refrigerant circulation line through which a refrigerant circulates, said refrigerant circulation line comprising: an engine-driven compressor for circulating said refrigerant; a cooling water circulation line through which a cooling water for cooling said engine circulates; a cooling water-exhaust heat heat-exchanger for exchanging heat between said cooling water and exhaust heat from said engine; a cooling water-refrigerant heat-exchanger for exchanging heat between said cooling water and said refrigerant; an inside heat-exchanger for exchanging heat between said refrigerant and the air inside a room; an outside heat-exchanger for exchanging heat between said refrigerant and the air outside said room; an expansion valve arranged in series with said inside heat-exchanger; a four-way valve for reversing the flow of said refrigerant at said inside heat-exchanger and at said outside heat-exchanger; a pressure-measuring device for measuring the pressure in said refrigerant circulation line downstream of said compressor and upstream of said expansion valve; and an exhaust heat controller for controlling the exhaust heat from said engine, based on the pressure measured by said pressure-measuring device, so as to adjust the temperature of said cooling water via said cooling water-exhaust heat heat-exchanger. In the above apparatus, the cooling water-refrigerant heat-exchanger is preferably disposed in the refrigerant circulation line between the expansion valve and the compressor, thereby efficiently compensating for insufficient heat of evaporation of the refrigerant. Also in the above apparatus, the exhaust heat controller is preferably a device for controlling exhaust heat from the engine by changing the heat efficiency of the engine, e.g., by controlling at least one of (a) the ignition timing of the engine, (b) the opening and closing timing of an intake port valve and an exhaust port valve, and (c) the opening of a fuel gas-controlling valve. According to the above apparatus, when the temperature of the air inside or outside the room is low, i.e., in a heating operation at low temperatures, and thus exhaust heat from the engine is not sufficient to compensate for insufficient heat of evaporation, a device for controlling exhaust heat from the engine preferably by changing the heat efficiency of the engine allows for efficiently improving heating power during heating operation at low temperatures without any drawbacks. A conceivable countermeasure for the problem described earlier in heating a room during cold weather is to use a device for increasing exhaust heat from the engine by increasing the speed of revolutions of the engine. However, when the speed of revolutions of the engine is increased in order to increase heating power during heating operation at low temperatures, noise from the engine is increased, and further, the life of the engine is shortened. Thus, controlling at least one of (a) the ignition timing of the engine, (b) the opening and closing timing of an intake port valve and an exhaust port valve, and (c) the opening of a fuel gas-controlling valve, thereby lowering heat efficiency of the engine, is preferred. When heat efficiency of the engine is lowered, exhaust heat from the engine can be efficiently increased, thereby exerting more heat on the refrigerant passing between the expansion valve and the compressor. Accordingly, heating power can be increased without increasing the speed of revolutions of the engine, and thus without increasing engine noise or shortening the life of the engine.

In addition, when the engine-driven compressor is a gear-driven type, more power can be transmitted from the engine to the compressor as compared with a conventional belt-driven type, thereby saving energy for operating the engine and increasing exhaust heat to heat the refrigerant, i.e., compensating for insufficient heat of evaporation of the refrigerant. Accordingly, heat of condensation can be efficiently increased.

Further, when the cooling water circulation line is composed of a first channel forming a closed loop through the engine, a second channel forming a closed loop through the engine and a radiator for cooling the cooling water, and a third channel forming a closed loop through the engine and the cooling water-refrigerant heat-exchanger, the quantity of heat exchanged at the cooling water-refrigerant heat-exchanger can be controlled by manipulating linear-type switching valves so as to adjust the quantity of each cooling water circulating through the respective three channels.

Another important aspect of the present invention is to provide a method for stable operation of a heat pump apparatus comprising, in a refrigerant circulation line through which a refrigerant circulates, an engine-driven compressor for circulating said refrigerant; a cooling water circulation line through which a cooling water for cooling said engine circulates; an inside heat-exchanger for exchanging heat between said refrigerant and the air inside a room; an outside heat-exchanger for exchanging heat between said refrigerant and the air outside said room; and an expansion valve arranged in series with said inside heat-exchanger; a four-way valve for reversing the flow of said refrigerant at said inside heat-exchanger and at said outside heat-exchanger, said method comprising the steps of: measuring the pressure in said refrigerant circulation line downstream of said compressor and upstream of said expansion valve (or measuring the difference in pressure between the high pressure side, i.e., downstream of the compressor and upstream of the expansion valve, and the low pressure side, i.e., downstream of the expansion valve and upstream of the compressor, of the refrigerant circulation line); controlling exhaust heat from said engine based on said measured pressure, thereby adjusting the temperature of said cooling water; and exchanging heat between said cooling water and said refrigerant, thereby adjusting the conditions of said refrigerant which enters said compressor. In the above method, as described earlier in connection with the apparatus, the step of controlling exhaust heat from the engine is preferably conducted in such a way as to increase the exhaust heat if the pressure of the refrigerant between the compressor and the expansion valve is lower than a given level, and wherein the step of exchanging heat between the cooling water and the refrigerant is conducted between the expansion valve and the compressor. Further in the above method, as also described in connection with the apparatus, the step of controlling exhaust heat preferably comprises lowering heat efficiency of the engine, e.g., controlling at least one of (a) the ignition timing of the engine, (b) the opening and closing timing of an intake port valve and an exhaust port valve, and (c) the opening of a fuel gas-controlling valve. Also in the above method, the engine-driven compressor is preferably operated with a gear mechanism which transmits power from the engine to the compressor. Further, heat exchanged between the cooling water and the refrigerant can be controlled by adjusting the quantity of the cooling water which circulates through the cooling water-refrigerant heat-exchanger as described earlier in connection with the apparatus.

The above method for stable operation of the heat pump apparatus is effectively employed when the inside heat-exchanger functions as a condenser, i.e., in the heating mode. However, the method can be employed when the inside heat-exchanger functions as an evaporator, in the cooling mode. For example, when heat of condensation at the outside heat-exchanger is relatively large or heat of evaporation at the inside heat-exchanger is relatively small, e.g., during low outside temperatures or windy conditions, exhaust heat from the engine can be used for increasing heat of evaporation or decreasing heat of condensation, thereby allowing for stable operation of the heat pump apparatus.

DETAILED DESCRIPTION OF THE PREFERRED EMBODIMENT

In the present invention, especially in the heating mode, the step of lowering heat efficiency of the engine preferably comprises controlling at least one of (a) the ignition timing of said engine, (b) the opening and closing timing of an intake port valve and an exhaust port valve, and (c) the opening of a fuel gas-controlling valve in order to lower heat efficiency of the engine, thereby increasing exhaust heat from the engine to compensate for heat of evaporation of the refrigerant. Methods other than lowering heat efficiency of the engine can be employed in order to control exhaust heat transferred to the refrigerant in the present invention. For example, the exhaust heat control can be conducted by controlling the r.p.m's of a water pump, i.e., by increasing the r.p.m.'s of the water pump, it is possible to increase heat transferred to cooling water (raising the temperature of the cooling water), thereby increasing heat transferred to the refrigerant. Accordingly, even during cold weather, sufficient heating power can be sustained without increasing engine noise or shortening the life of the engine. The present invention will be further explained with reference to an example based on FIGS. 1–9.

Basic Structures of Heat Pump Apparatus

Figure 1:
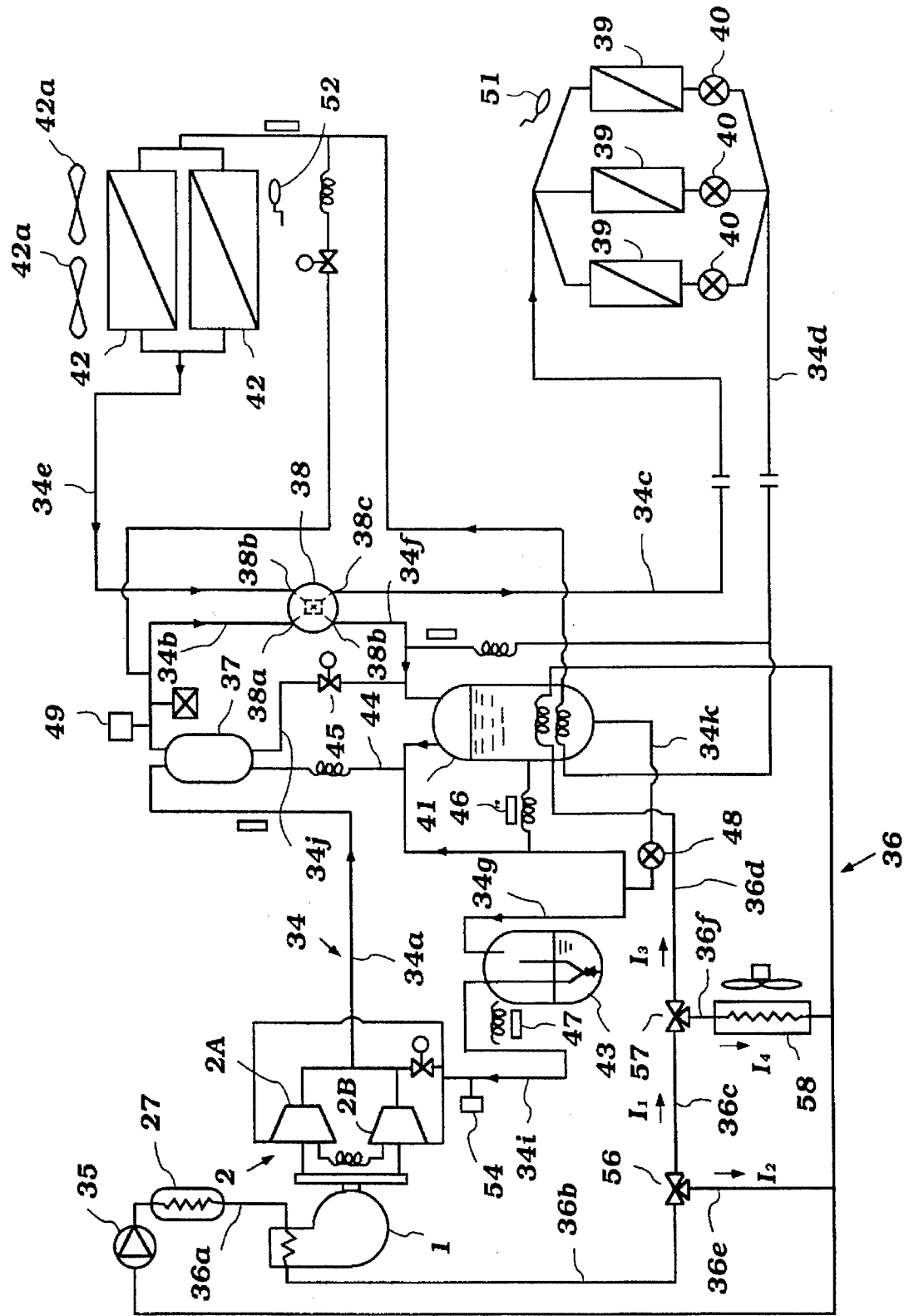
FIG. 1 is a schematic circuit illustrating basic structures of an engine-driven heat pump apparatus according to the present invention.
Figure 2:
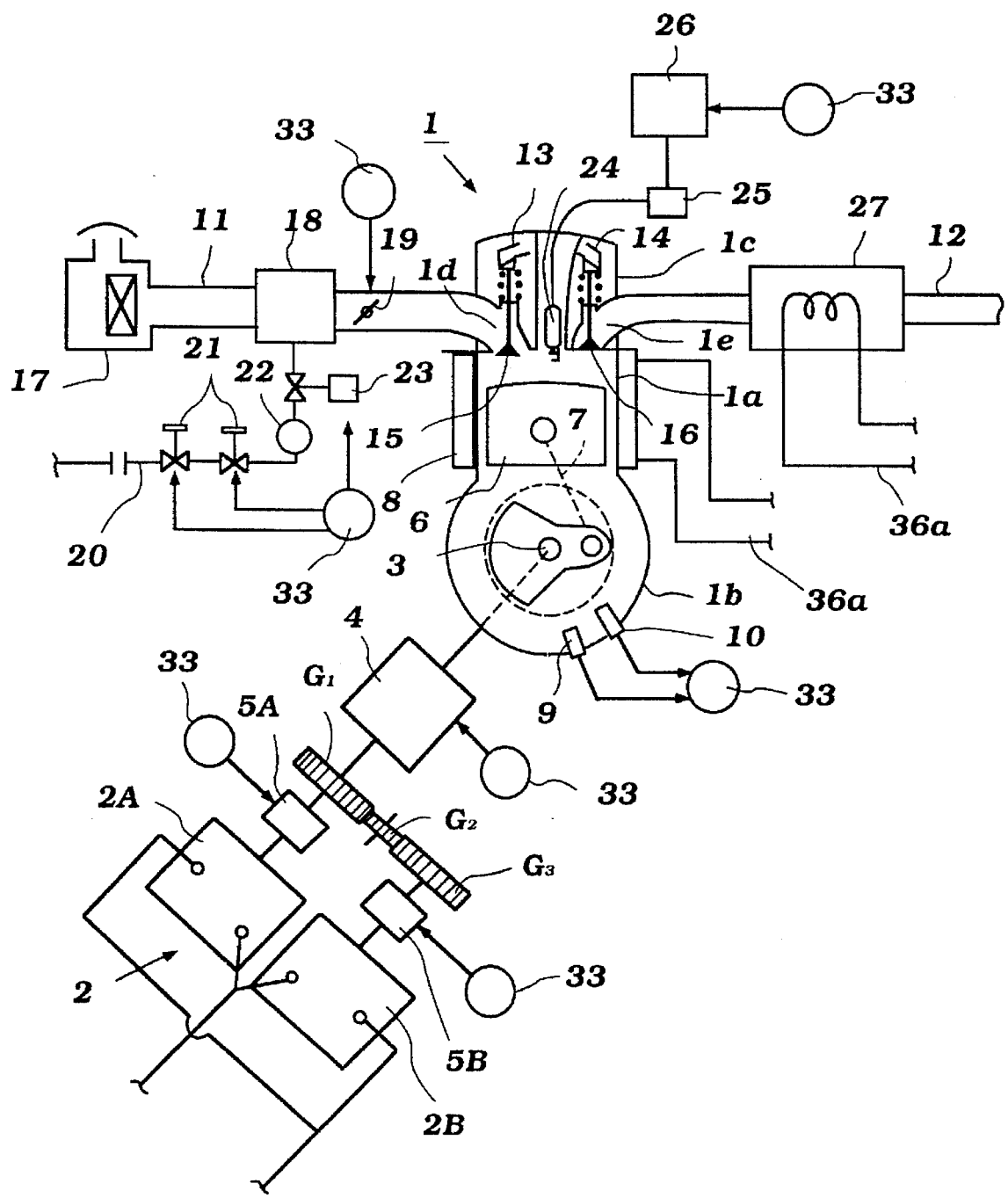
FIG. 2 is a schematic view illustrating an example of structures relating to an engine used in an engine-driven heat pump apparatus according to the present invention.

FIG. 1 is a schematic circuit illustrating basic structures of an engine-driven heat pump apparatus according to the present invention. FIG. 2 is a schematic view illustrating an example of structures relating to an engine used in an engine-driven heat pump apparatus according to the present invention.

The heat pump apparatus comprises a refrigerant circulation line 34 which is a closed loop including compressors 2A and 2B, and a cooling water circulation line 36 which a closed loop including a water pump 35, as shown in FIG. 1. The refrigerant circulation line 34 is a circuit through which a refrigerant such as freon circulates via the compressors 2, which refrigerant circulation line includes a refrigerant line 34a from outlets of the compressors 2A and 2B to an oil separator 37, a refrigerant line 34b from the oil separator 37 to a four-way valve 38 in the heating mode, a refrigerant line 34c from the four-way valve 38 to three inside heat-exchangers 39, a refrigerant line 34d from the inside heat-exchangers to two outside heat-exchangers 42 through expansion valves 40 and through the inside of the accumulator 41, a refrigerant line 34e from the outside heat-exchangers 42 to the four-way valve 38, a refrigerant line 34 f from the four-way valve 38 to the accumulator 41 in the heating or cooling mode, a refrigerant line 34g from the accumulator 41 to a sub-accumulator 43, and a refrigerant line 34i from the sub-accumulator 43 to each inlet of the compressors 2A and 2B.

An oil return line 44 and a bypass line 34j are led from the oil separator 37, the oil return line 44 connects the refrigerant line 34g, and the bypass line 34j connects the refrigerant line 34f and is provided with a bypass valve 45. The accumulator 41 and the sub-accumulator 43 are provided with temperature sensors 46 and 47, respectively. The bottom of the accumulator 41 is connected to the refrigerant line 34g via a bypass line 34k which is mainly used for oil return, and the bypass line 34k is provided with a bypass valve 48.

Figure 3:
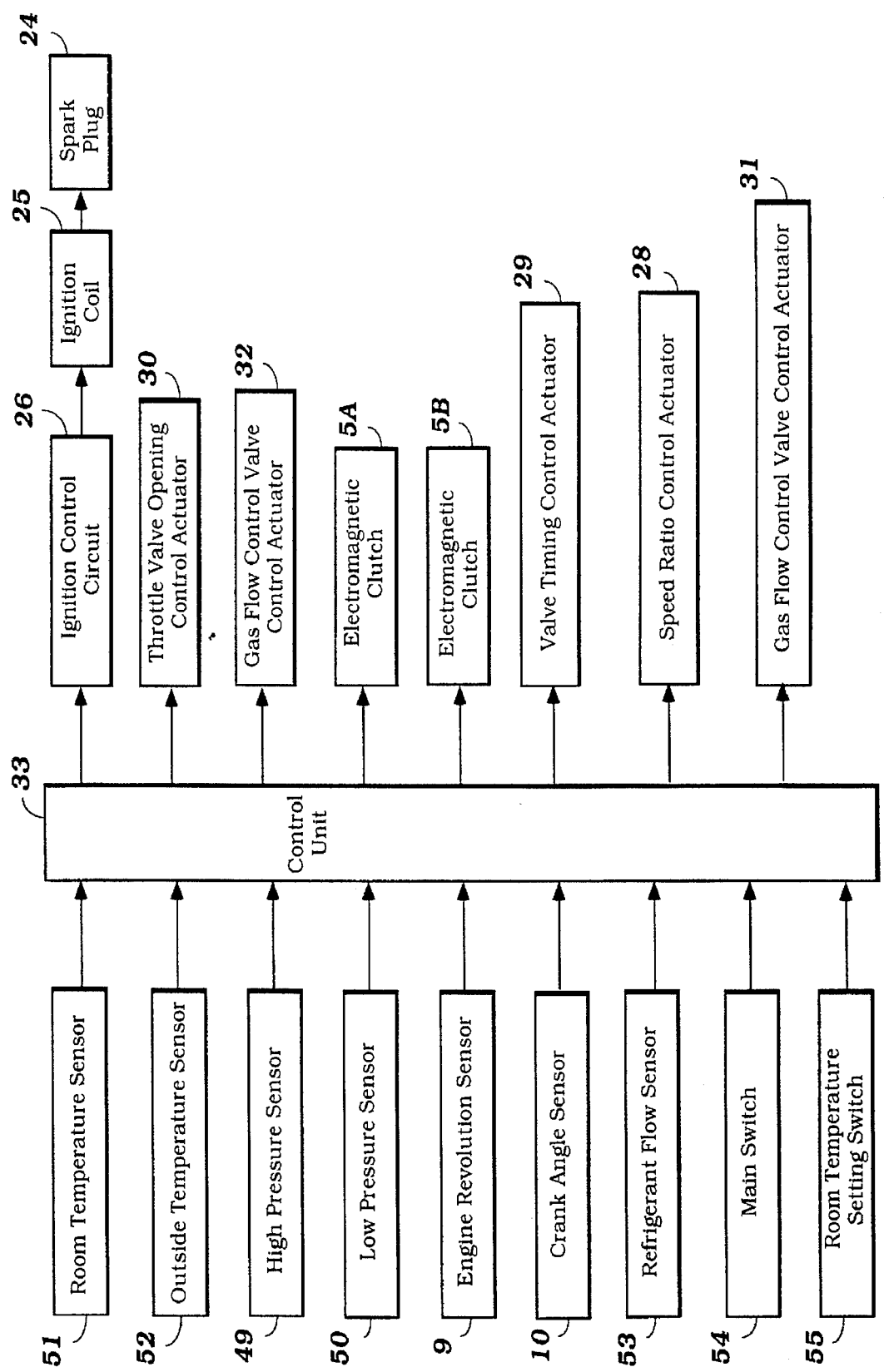
FIG. 3 is a block chart illustrating a control system used in an engine-driven heat pump apparatus according to the present invention.

In the above refrigerant circulation line 34, a high pressure sensor 49 for measuring the pressure on the condenser side is provided in the refrigerant line 34b, and a low pressure sensor 50 for measuring the pressure on the evaporator side is provided in the refrigerant line 34i. A room temperature sensor 51 for measuring the room temperature is provided near the inside heat-exchangers 39, and an outside temperature sensor 52 for measuring the outside temperature is provided near the outside heat-exchangers 42. The high pressure sensor 49, the low pressure sensor 50, the room temperature sensor 51 and the outside temperature sensor 52 are connected to the control unit 33 as shown in FIG. 3. A refrigerant flow sensor 53 for sensing the amount of circulating refrigerant, a main switch 54, and a temperature setting switch 55 for setting the desired room temperature are also connected to the control unit 33.

Structures Associated with Engine

As depicted in FIG. 2, the engine-driven heat pump apparatus depicted in FIG. 1 is provided with a water-cooled gas engine 1 and the compressors 2 (2A and 2B) driven by the gas engine 1, and a crank shaft 3 of the gas engine 1 connects a speeding device 4 (a mechanism for changing the speed ratio of the engine 1 to the compressors 2A and 2B) as depicted in FIG. 2. A power shaft of the speeding device 4 connects the compressor 2A via an electromagnetic clutch 5A. A gear G1 connecting the power shaft of the speeding device 4 meshes with a gear G3 having the same diameter as the gear G1 via a gear G2 having a smaller diameter than the gear G1. The gear G3 connects the other compressor 2B via an electromagnetic clutch 5B.

The gas engine 1 shown in FIG. 2 comprises a piston 6, connecting rod 7 connecting the piston 6 and the crank shaft 3, a water-cooled jacket 8 formed around a cylinder 1a, an engine revolution sensor 9 and a crank angle sensor 10, both sensors being installed in the lower part of a crank case 1b. An intake port 1d and an exhaust port 1e formed in a cylinder head 1c of the gas engine 1 connect an intake air conduit 11 and an exhaust pipe 12, respectively. The intake port 1d and the exhaust port 1e are opened and closed based on appropriate timing by an intake port valve 15 and an exhaust port valve 16 driven by respective rocker arms 13 and 14. The intake air conduit 11 connects an air cleaner 17 and an air and gas mixer 18. A throttle valve 19 is installed downstream of the mixer 18 in the intake air conduit 11. The mixer 18 connects a fuel gas supply pipe 20 which connects a fuel tank (not shown). Two gas flow on-off valves 21 and a fuel gas pressure reducer (a regulator of gas pressure) 22, and a fuel gas amount controlling valve 23 are connected in the fuel gas supply pipe 20. A spark plug 24 is fixed onto the cylinder head 1c of the gas engine 1, and connects an ignition coil 25 and an ignition control circuit 26. A muffler including an exhaust gas heat-exchanger 27 is installed in the middle of the exhaust pipe 12.

FIG. 3 is a block chart illustrating a control system used in an engine-driven heat pump apparatus according to the present invention. As shown in FIG. 3, in the speeding device, the speed ratio of the engine 1 to the compressors 2A and 2B is adjusted by an actuator 28 for changing the speed ratio. The timing of opening and closing the intake port valve 15 and the exhaust port valve 16 (valve timing) is adjusted by an actuator 29 for changing valve timing. The opening of the throttle valve 19 is adjusted by an actuator 30 for changing the opening of the throttle valve 19. The opening of the gas flow on-off valve 21 and that of the fuel gas volume controlling valve 23 are adjusted by an actuator 31 for changing the opening of the valve 21 and an actuator 32 for changing the opening of the valve 23, respectively. Also as shown in FIG. 3, the actuators 28 through 32, the engine speed sensor 9, the crank angle sensor 10, the electromagnetic clutches 5A and 5B, and an ignition control circuit 26 are connected to a control unit 33.

Cooling Water Line

The cooling water circulation line 36 is a line for circulating a cooling water for cooling the gas engine 1 via the water pump 35. The cooling water circulation line 36 is composed of: a cooling water line 36a from the outlet of the water pump 35 to the cooling water inlet of the gas engine (the inlet provided in the water-cooled jacket 8 in FIG. 2) through the exhaust gas heat-exchanger 27; a cooling water line 36b from the cooling water outlet of the gas engine 1 (the outlet provide in the water-cooled jacket 8 in FIG. 2) to a temperature-sensitive three-way valve 56; a cooling water line 36c from the temperature-sensitive three-way valve 56 to a linear-type three-way valve 57; a cooling water line 36d from the linear-type three-way valve to the inlet of the water pump 35 through the accumulator 41; a cooling water line 36e from the temperature-sensitive three-way valve 56 to the cooling water line 36d; and a cooling water line 36f from the linear-type three-way valve 57 to the cooling water line 36d. The cooling water line 36f includes a heat-exchanger 58 for radiating heat.

Figure 4:
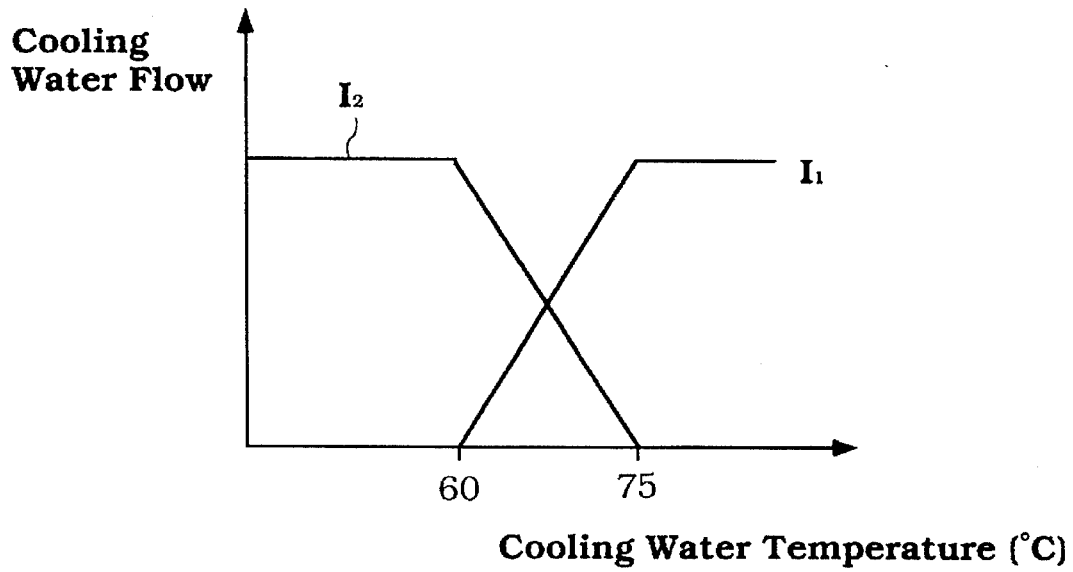
FIG. 4 is a schematic graph showing a specific characteristic of a temperature-sensitive three-way valve used in a cooling water circulation line.

The temperature-sensitive three-way valve 56 functions in such a way that when the cooling water temperature is not higher than 60° C., for example, as shown in FIG. 4 (the temperature is detected by a thermostat provided with the three-way valve), the cooling water line 36c is completely closed while the cooling water line 36e is completely open, thereby leading the cooling water only to the cooling water line 36e. When the cooling water temperature is higher than 60° C. but not higher than 75° C., for example, as shown in FIG. 4, the cooling water line 36c partially opens while the cooling water line 36e partially closes, thereby leading the cooling water both to the cooling water lines 36c and 36e. When the cooling water temperature is higher than 75° C., for example, as shown in FIG. 4, the cooling water line 36c is completely opened while the cooling water line 36e is completely closed, thereby leading the cooling water only to the cooling water lines 36c. $I_1$ and $I_2$ indicate the amount of cooling water circulating through the cooling water lines 36c and 36e, respectively.

Figure 5:
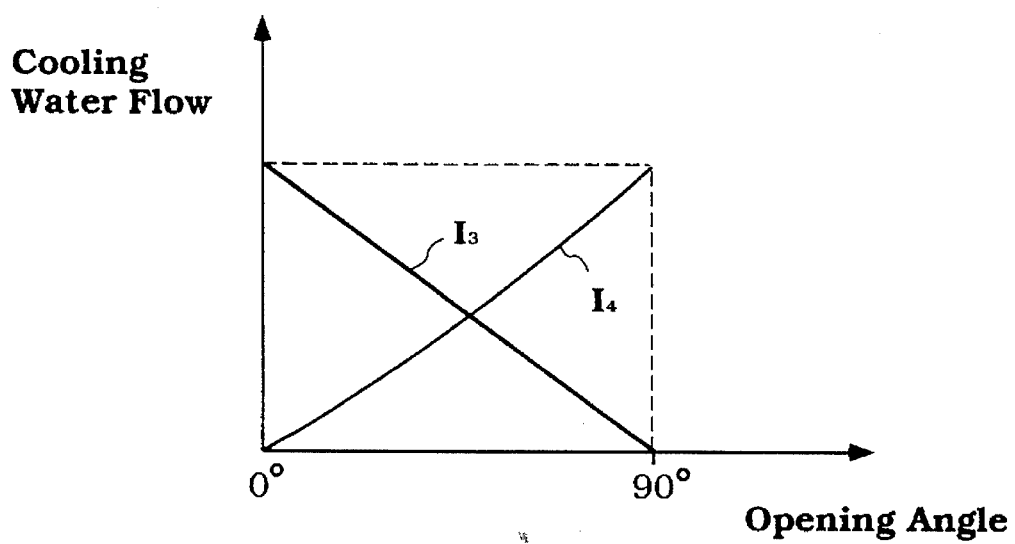
FIG. 5 is a schematic graph showing a specific characteristic of a linear-type three-way valve used in a cooling water circulation line.

The linear-type three-way valve 57 has the characteristics shown in FIG. 5, for example. In FIG. 5, $I^3$ and $I^4$ indicate the amount of cooling water circulating through the cooling water lines 36d and 36f. The linear-type three-way valve permits the volume of cooling water $I_3$ and $I_4$ through the respective cooling water lines 36d and 36f to increase linearly in association with an increase in the opening of the valve, as shown in the Figure. Thus, when the opening angle of the valve 57 is 0°, the cooling water line 36d is completely open while the cooling water line 36f is completely closed, thereby leading the full volume of cooling water $I_1$ (=$I_3$) circulating through the cooling water line 36c to the accumulator 41. When the opening angle of the valve 57 is 90°, the cooling water line 36d is completely closed while the cooling water line 36f is completely open, thereby leading the full volume of cooling water $I_1$ (=$I_4$) circulating through the cooling water line 36c to the heat-exchanger 58 for radiating heat, by bypassing the accumulator 41.

The above-mentioned refrigerant-heating system with the use of exhaust heat from the engine via engine cooling water can be formed of a heat-exchanger of double-tube type to exchange heat between the engine cooling water and the refrigerant, instead of the use of the accumulator provided with a channel through which the cooling water passes in the above embodiment. Exchanging heat between the cooling water and the refrigerant can be conducted upstream of the compressor, e.g., not only in the accumulator 41 but also in the refrigerant line 34e, 34f, 34g, or 34i, or in the sub-accumulator Heating Operation of Heat Pump Apparatus Heating operation of the above heat pump apparatus will be explained with reference to a p-i chart shown in FIG. 9.

When the gas engine 1 is started, the revolution of the crank shaft 3 thereof is increased by the speeding device 4, thereby transmitting power to the compressor 2A via the electromagnetic clutch 5A which is engaged, while transmitting power to the other compressor 2B via gears G1, G2, and G3, and the electromagnetic clutch 5B. Accordingly, both compressors 2A and 2B are operated at the same speed. When the compressors 2A and 2B are driven by the engine revolution as described above, the vaporized refrigerant in a state marked (1) in FIG. 9 (pressure $P_1$ and enthalpy $i_1$) is introduced into the compressors 2A and 2B from the refrigerant circulation line 34i, compressed, and changed to a state marked (2) in FIG. 9 (pressure $P_2$ and enthalpy $i_2$) in which the refrigerant is under a high pressure with a high temperature. The necessary power of the compressors 2A and 2B per unit weight of the refrigerant, AL, is expressed as ($i_2-i_1$). The pressure of the refrigerant introduced into the compressors 2A and 2B, $P_1$, is detected by the low pressure sensor 50, and input into the control unit 33.

The above vaporized refrigerant under a high pressure with a high temperature is led to the oil separator 37 through the refrigerant line 34a, and the oil is removed therefrom by the oil separator 37. The oil-free vaporized refrigerant is moved to the four-way valve 38 through the refrigerant line 34b. The oil separated from the refrigerant by the oil separator 37 is returned to the refrigerant line 34g through the oil return line 44. The pressure of the refrigerant, under a high pressure with a high temperature, circulating through the refrigerant line 34b, $P_2$ (pressure loss is negligible), is detected by the high pressure sensor 49, and input into the control unit 33.

In the heating mode, port 38a and port 38b of the four-way valve 38 are communicated with port 38c and port 38d, respectively. The vaporized refrigerant under a high pressure with a high temperature flows into the refrigerant line 34c via the four-way valve 38 and then the inside heat-exchangers 39 functioning as condensers. The vaporized refrigerant under a high pressure with a high temperature introduced into the inside heat-exchangers 39 is liquefied while radiating heat of condensation $Q_2$ to the air in a room, and sub-cooled to a state marked (3) in FIG. 9 (pressure $P_2$ and enthalpy $i_3$) so as to liquefy the refrigerant, thereby heating the room using radiated heat $Q_2$ (=$i_2-i_3$).

Figure 9:
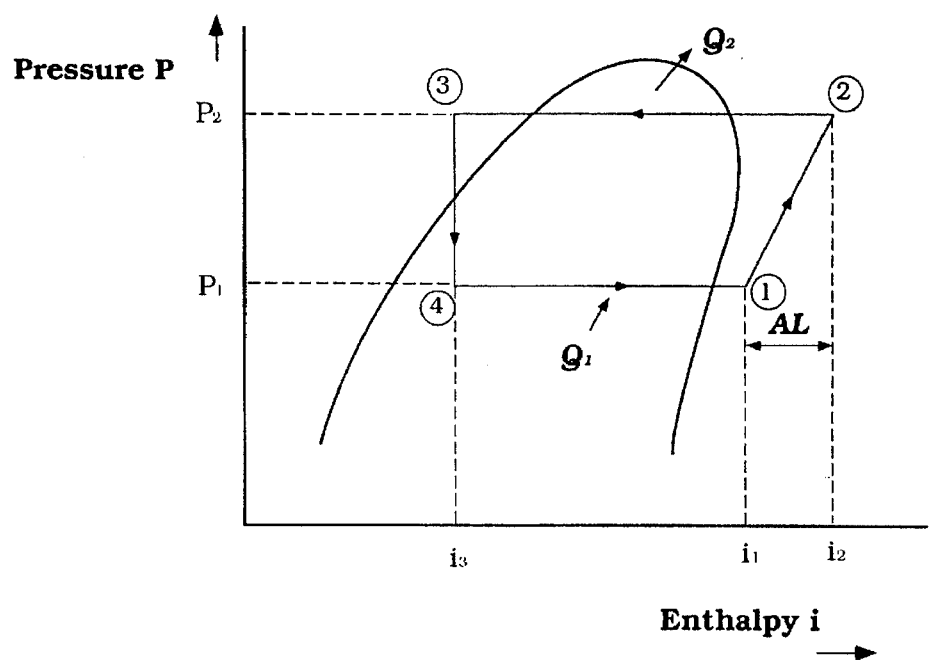
FIG. 9 is a p-i chart showing changes in pressure and enthalpy of a refrigerant in a heating or cooling cycle.

The refrigerant under a high pressure liquefied at the inside heat-exchangers 39 undergoes drastic reduction of pressure by the expansion valves 40, and is changed to a state marked (4) in FIG. 9 (pressure $P_1$ and enthalpy $i_3$), in which a portion of the refrigerant is vaporized and the vapor-liquid refrigerant flows in the refrigerant line 34d towards the outside heat-exchangers 42.

Meanwhile, the cooling water circulating in the cooling water circulation line 36 by operation of the water pump 35 is pushed out of the water pump 35, flows in the cooling water line 35a, absorbs heat from exhaust gas radiating from the exhaust pipe 12 of the gas engine 1 at the exhaust gas heat-exchanger 27, and further absorbs heat from the gas engine 1 via the water-cooled jacket 8, thereby cooling the gas engine 1 while absorbing heat. The cooling water used for cooling the gas engine 1 flows in the cooling water line 36b, and reaches the temperature-sensitive three-way valve 56. In the above, when the cooling water temperature is low at the beginning of operation of the gas engine 1, e.g., not higher than 60° C., as describe earlier with reference to FIG. 4, the temperature-sensitive three-way valve 56 completely closes the cooling water line 36c while completely opening the cooling water line 36e, thereby returning all the cooling water to the water pump 35 through the cooling water line 36e. Accordingly, the temperature of the cooling water is gradually elevated, thereby quickly warming the gas engine 1 which is cool. When the cooling water temperature is higher than 60° C. but not higher than 75° C., the cooling water line 36c starts opening while the cooling water line 36e starts closing, and when the cooling water temperature is higher than 75° C., the cooling water line 36c is completely open while the cooling water line 36e is completely closed, thereby leading all the cooling water to the linear-type three-way valve 57 through the cooling water lines 36c. If the opening angle of the valve 57 is set at 0° in the heating mode, all the cooling water flows into the accumulator 41 through the cooling water line 36d, as shown in FIG. 5. In the accumulator 41, the refrigerant circulating through the refrigerant line 34d and the liquefied refrigerant accommodated in the accumulator 41 are heated by the cooling water circulating through the cooling water line 36d, i.e., exhaust heat from the gas engine 1 (transmitted heat from the exhaust gas and absorbed heat from the gas engine 1 through the cooling water) is exerted on the refrigerant. The refrigerant circulating through the refrigerant line 34d flows into the outside heat-exchangers 42 after being heated by the exhaust heat from the gas engine 1 in the accumulator 41 as described above, in which outside heat-exchanger the refrigerant is vaporized by absorbing heat of evaporation from the outside air. If the temperature of the outside air is higher than a given level, the fans 42a of the outside heat-exchangers 42 are operated, thereby enhancing absorption of heat from the outside air in the outside heat-exchangers 42.

The refrigerant moves from the outside heat-exchangers 42 to the four-way valve 38 through the refrigerant line 34e, in which port 38b and port 38d of the four-way valve 38 are communicated with each other in the heating mode, thereby leading the refrigerant to the refrigerant line 34f via the four-way valve 38, and reaching the accumulator 41.

In the accumulator 41, the vapor-liquid refrigerant is separated into the vapor refrigerant and the liquid refrigerant. The liquid refrigerant receives exhaust heat from the gas engine 1 via the cooling water circulating through the cooling water liner 36d, and partially vaporizes.

The vapor refrigerant in the accumulator 41 is moved to the sub-accumulator 43, and further moved to the compressors 2A and 2B through the refrigerant line 34i. The state of the vapor refrigerant is returned to a state marked (1) in FIG. 9 (pressure $P_1$ and enthalpy $i_1$), and the vapor refrigerant is again compressed by the compressors 2A and 2B, thereby repeating the same operation as described above.

The refrigerant receives exhaust heat from the gas engine 1 in the accumulator 41 and heat from the outside air in the outside heat-exchangers 42, during a period between reduction of pressure by the expansion valves 40 and introduction to the compressors 2A and 2B, whereby the refrigerant is vaporized and further superheated by receiving heat $Q_1$ $(=i_1-i_3)$.

Accordingly, in the heating mode, exhaust heat from the gas engine 1 is exerted on the refrigerant through the cooling water absorbing the heat, and added to heat originally radiated from the inside heat-changers 39, thereby improving heating power to obtain radiated heat $Q_2$.

Heating Operation at Low Temperatures

However, in the above operation, when the temperature of the air inside or outside the room is too low, heating power will be insufficient for the reason set forth earlier. The outside air may not sufficiently heat the refrigerant in the outside heat-exchangers 42, especially during cold weather.

In this embodiment, when the outside temperature measured by the outside temperature sensor 52 is lower than a given level, operation of the fans 42a of the outside heat-exchangers 42 is discontinued, and exhaust heat from the gas engine 1 is increased, thereby increasing heat added to heat originally radiated from the inside heat-exchangers 39 to obtain radiated heat $Q_2$. In this way, heating power can be increased. In particular, the pressure on the condenser side (the outside heat-exchanger in the heating mode), $P_2$, is detected by the high pressure sensor 49 in order to evaluate heating power, exhaust heat from the gas engine 1 is accordingly controlled by the control unit 33 based on the pressure. When the outside temperature is not low as compared with the temperature of evaporation of the refrigerant in the inside heat-exchangers 39, the fans 42a need not be stopped. Heat transfer can be promoted by operating the fans.

In this embodiment, a method for increasing exhaust heat radiated from exhaust gas and absorbed from the gas engine itself by lowering heat efficiency of the gas engine 1 is employed as a means for increasing exhaust heat without increasing the r.p.m.'s of the gas engine 1.

Figure 6:
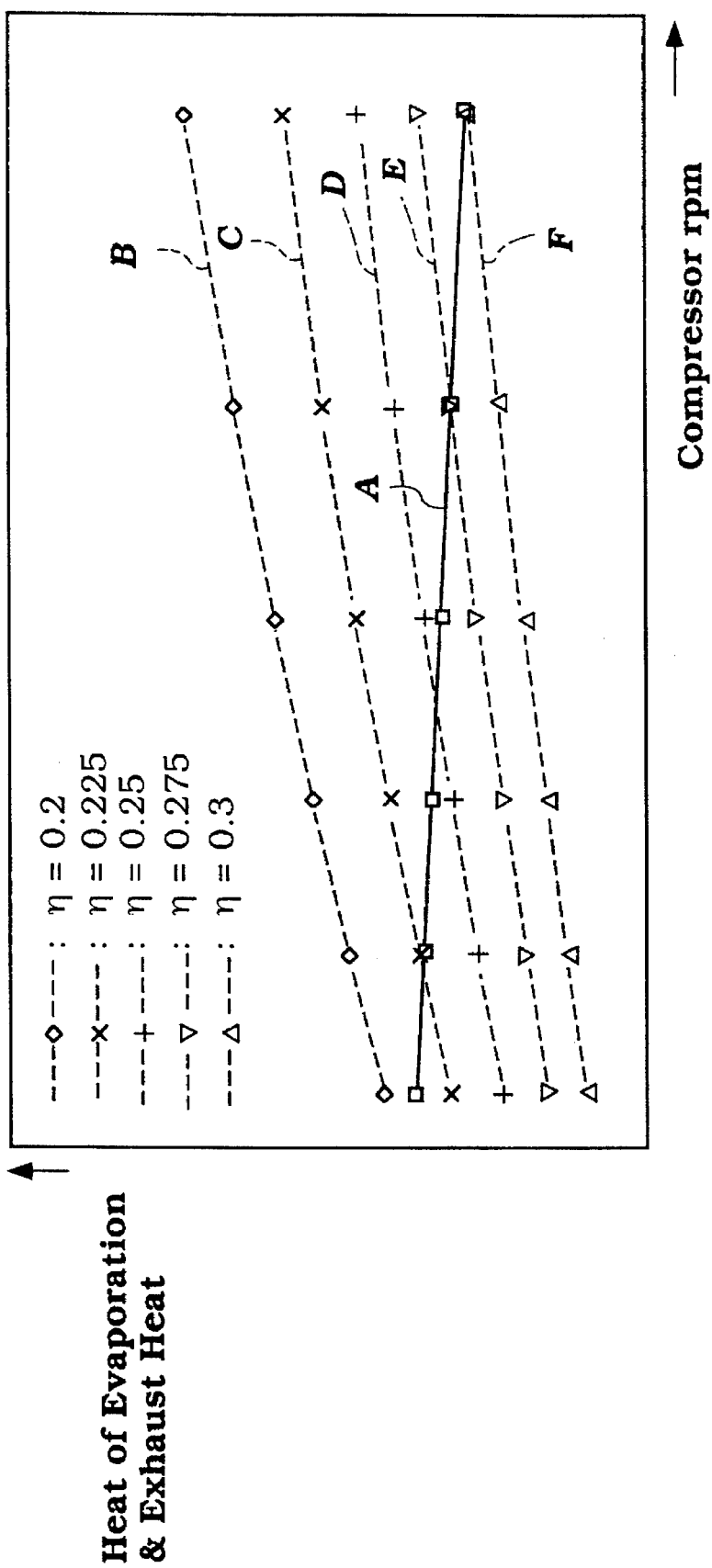
FIG. 6 is a schematic graph showing an example of the relationship between the r.p.m.'s of a compressor and heat of evaporation and exhaust heat, with a parameter of heat efficiency of the engine.

FIG. 6 is a schematic graph showing an example of the relationship between the r.p.m.'s of a compressor and heat of evaporation and exhaust heat, with a parameter of heat efficiency $\eta$ of the gas engine. Solid line A indicates heat of evaporation, broken lines B-F indicate the quantity of exhaust heat when heat efficiency $\eta$=0.2, 0.225, 0.25, 0.275, and 0.3. As is clearly shown, the lower the heat efficiency $\eta$, the more the exhaust heat obtained per the quantity of heat of evaporation.

In this embodiment, as a means for lowering heat efficiency of the gas engine, a method for controlling at least one of (a) the ignition timing of the engine, (b) the opening and closing timing of an intake port valve and an exhaust port valve, and (c) the opening of a fuel gas-controlling valve, is employed.

In controlling the ignition timing, the control unit 33 delays ignition by a spark plug 24, by sending a control signal to an ignition control circuit 26 based on at least one of the following factors: pressure $P_2$ of the refrigerant on the condenser side (the inside heat-exchangers in the heating mode) detected by the high pressure sensor 49, the revolution speed of the engine detected by the engine speed sensor 9, the crank angle detected by the crank angle sensor 10, the opening of the throttle valve, and the boost value. When the ignition timing is delayed as described above, power supplied by combustion of gas, which is used for operation of a piston 6, is decreased, thereby slightly decreasing the output of the gas engine 1; however, the opening of the throttle valve is enlarged, and the temperature of exhaust gas is increased accordingly. Thus, the cooling water absorbs more exhaust heat in the exhaust gas heat-exchanger 27, thereby increasing heating power. When the output of the gas engine is lowered, the revolution speed of the gas engine will decrease by the degree of the decrease in the output, due to the load of the compressors 2. However, by increasing the amount of mixed gas supplied to a cylinder 1a of the gas engine 1, it is possible to compensate for the decrease in the output and in the revolution speed of the gas engine 1.

Figure 7:
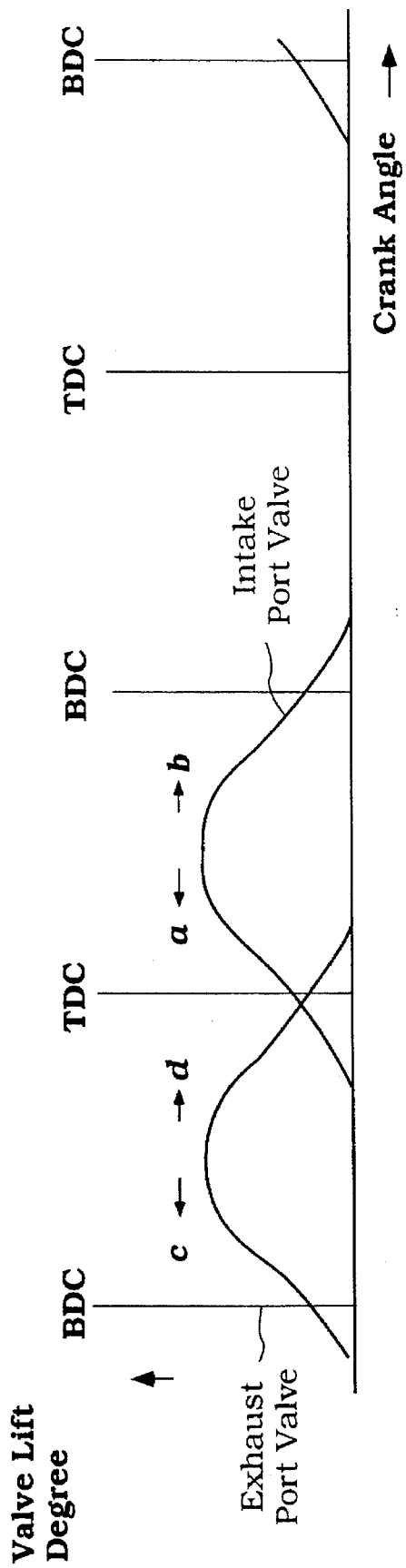
FIG. 7 is a schematic timing chart showing an example of the relationship between a crank angle and the opening of an intake port valve and an exhaust port valve.
Figure 8:
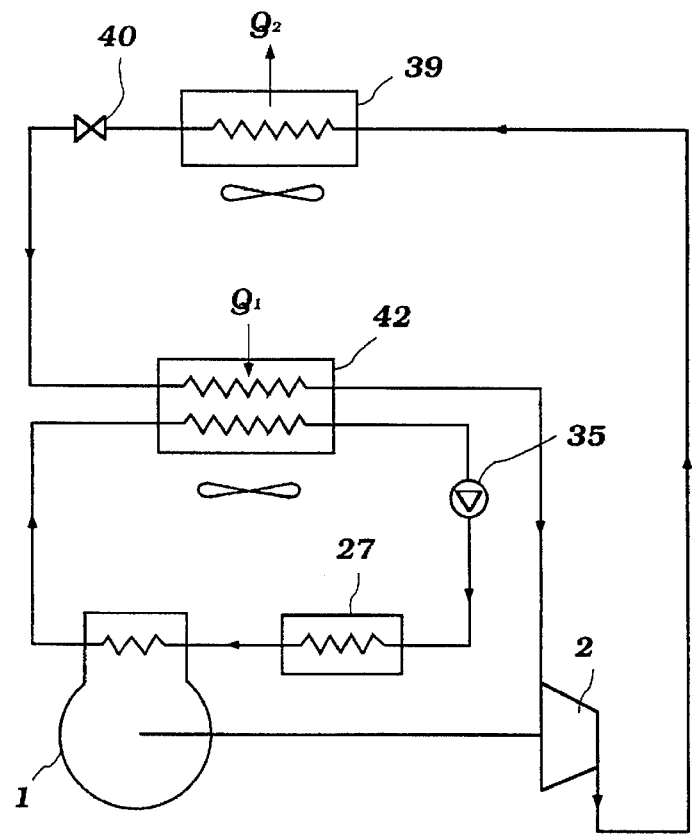
FIG. 8 is a schematic circuit illustrating basic structures of an engine-driven heat pump apparatus.

In controlling the valve timing, the control unit 33 sends a control signal to the actuator 29 to change the valve timing, and shifts the opening and closing timing of the intake port valve 15 and the exhaust port valve 16 in directions marked with arrows "a" to "d" in FIG. 7, thereby lowering heat efficiency of the gas engine 1. That is, the time period during which the valves 15 and 16 are open is prolonged, thereby introducing more gas into the combustion chamber of the gas engine 1, and increasing exhaust heat radiating from the gas engine. In FIG. 7, the horizontal axis and the vertical axis indicates crank angles and valve lift degrees, respectively, and TDC and BDC denotes top and bottom dead points of crank shaft, respectively.

In controlling the opening of a fuel gas-controlling valve, the control unit 33 sends a control signal to the actuator 31 to change the opening of the fuel valve so as to increase the opening of the gas flow on-off valve 21, thereby increasing concentration of fuel gas in mixed gas. As a result, combustion of the mixed gas in the combustion chamber is shifted from a lean burn region to a rich burn region. Accordingly, even though the energy transformed from combustion energy into kinetic energy in the gas engine 1 remains the same, the temperature of the exhaust gas upstream of the exhaust gas heat-exchanger 27 or the amount of exhaust gas is increased, due to an increase in temperature of exhaust gas discharged from the cylinder 1a to the exhaust pipe 12, delayed combustion in the exhaust pipe 12, and the like. As a result, it is possible to recover more exhaust heat in the exhaust gas heat-exchanger 27, thereby increasing heating power during heating operation at a low temperature.

Methods other than the above for lowering heat efficiency of the gas engine 1 are possible, such as a method for controlling the speed ratio of the speeding device 4 via the actuator 28 to change the speed ratio.

In the aforesaid embodiment, during heating operation when the temperature of the air outside or inside a room is low, if the pressure of the refrigerant on the condenser side (the pressure at the outlet of the compressor), $P_2$, is low due to insufficient exhaust heat from the engine 1, heat efficiency of the engine 1 is lowered by manipulating the control unit 33 to control at least one of (a) the ignition timing of the engine 1, (b) the opening and closing timing of the intake port valve 15 and the exhaust port valve 16 (the valve timing), and (c) the opening of the gas flow on-off valve 21, thereby increasing exhaust heat from the engine 1 and subsequently increasing the temperature of the heat cycle of the refrigerant. As a result, it is possible to increase heating power during heating operation at low temperatures without increasing the r.p.m.'s of the gas engine 1, and thus without increasing engine noise and shortening the life of the engine 1. For example, a heat cycle between pressures of 12 kg/cm$^2$G and 1.5 kg/cm$^2$G can be shifted to that between pressures of 20 kg/cm$^2$G and 4 kg/cm$^2$G, thereby increasing radiated heat $Q_2$, i.e., increasing heating power.

In addition, in the aforesaid embodiment, the engine-driven compressor 2 is a gear-driven type using gears G1, G2, and G3, and thus more power can be transmitted from the gas engine 1 to the compressor 2 as compared with a conventional belt-driven type, thereby saving energy for operating the engine 1 and increasing exhaust heat to heat the refrigerant, i.e., increasing radiated heat $Q_2$ to increase heating power.

Cooling Operation

The engine-driven heat pump apparatus according to the present invention can be used as an air conditioner for cooling a room by reversing the flow of the refrigerant, i.e., manipulating the four-way valve 38. In the cooling mode, when the outside temperature is low, i.e., condensation capacity is higher than evaporation capacity, in order to compensate for insufficient heat of evaporation in the room, the refrigerant-heating system with the use of exhaust heat from the engine via engine cooling water can be used, thereby preventing a liquid return to the inlet of the compressor.

It will be understood by those of skill in the art that numerous variations and modifications can be made without departing from the spirit of the present invention. Therefore, it should be clearly understood that the forms of the present invention are illustrative only and are not intended to limit the scope of the present invention.

We claim:

1. An engine-driven heat pump apparatus comprising a refrigerant circulation line through which a refrigerant circulates, said refrigerant circulation line comprising: an engine-driven compressor for circulating said refrigerant; a cooling water circulation line through which a cooling water for cooling said engine circulates; a cooling water-exhaust heat heat-exchanger for exchanging heat between said cooling water and exhaust heat from said engine; a cooling water-refrigerant heat-exchanger for exchanging heat between said cooling water and said refrigerant; an inside heat-exchanger for exchanging heat between said refrigerant and the air inside a room; an outside heat-exchanger for exchanging heat between said refrigerant and the air outside said room; an expansion valve arranged in series with said inside heat-exchanger; a four-way valve for reversing the flow of said refrigerant at said inside heat-exchanger and at said outside heat-exchanger; a pressure-measuring device for measuring the pressure in said refrigerant circulation line downstream of said compressor and upstream of said expansion valve; and an exhaust heat controller for controlling exhaust heat from said engine based on the pressure measured by said pressure-measuring device so as to adjust the temperature of said cooling water via said cooling water-exhaust heat heat-exchanger.

2. The engine-driven heat pump apparatus according to claim 1, wherein said exhaust heat controller is a device for controlling exhaust heat from said engine by changing the heat efficiency of said engine.

3. The engine-driven heat pump apparatus according to claim 2, wherein said device for controlling exhaust heat by changing the heat efficiency of said engine is a device for controlling at least one of (a) the ignition timing of said engine, (b) the opening and closing timing of an intake port valve and an exhaust port valve, and (c) the opening of a fuel gas-controlling valve.

4. The engine-driven heat pump apparatus according to claim 1, wherein said cooling water-refrigerant heat-exchange is disposed in said refrigerant circulation line downstream of said expansion valve and upstream of said compressor.

5. The engine-driven heat pump apparatus according to claim 1, wherein said engine-driven compressor is a gear-driven type.

6. The engine-driven heat pump apparatus according to claim 1, wherein said cooling water circulation line is composed of a first channel forming a closed loop through said engine, a second channel forming a closed loop through said engine and a radiator for cooling said cooling water, and a third channel forming a closed loop through said engine and said cooling water-refrigerant heat-exchanger, in which said water circulation line is provided with at least one switching valve for controlling the quantity of each cooling water circulating through said respective three channels.

7. A method for stable operation of a heat pump apparatus comprising, in a refrigerant circulation line through which a refrigerant circulates, an engine-driven compressor for circulating said refrigerant; a cooling water circulation line through which a cooling water for cooling said engine circulates; an inside heat-exchanger for exchanging heat between said refrigerant and the air inside a room; an outside heat-exchanger for exchanging heat between said refrigerant and the air outside said room; and an expansion valve arranged in series with said inside heat-exchanger; a four-way valve for reversing the flow of said refrigerant at said inside heat-exchanger and at said outside heat-exchanger, said method comprising the steps of: measuring the pressure in said refrigerant circulation line downstream of said compressor and upstream of said expansion valve; controlling exhaust heat from said engine based on said measured pressure, thereby adjusting the temperature of said cooling water; and exchanging heat between said cooling water and said refrigerant, thereby adjusting the conditions of said refrigerant which enters said compressor.

8. The method for stable operation of the heat pump apparatus according to claim 7, wherein the step of controlling exhaust heat from said engine is conducted in such a way as to increase said exhaust heat if the pressure of the refrigerant downstream of said compressor and upstream of said expansion valve is lower than a given level, and wherein the step of exchanging heat between said cooling water and said refrigerant is conducted to the refrigerant downstream of said expansion valve and upstream of said compressor.

9. The method for stable operation of the heat pump apparatus according to claim 8, wherein the step of controlling exhaust heat comprises lowering the heat efficiency of said engine.

10. The method for stable operation of the heat pump apparatus according to claim 8, wherein the step of lowering heat efficiency of said engine comprises controlling at least one of (a) the ignition timing of said engine, (b) the opening and closing timing of an intake port valve and an exhaust port valve, and (c) the opening of a fuel gas-controlling valve.

11. The method for stable operation of the heat pump apparatus according to claim 7, wherein said engine-driven compressor is operated with a gear mechanism which transmits power from said engine to said compressor.

12. The method for stable operation of the heat pump apparatus according to claim 7, wherein the step of exchanging heat between said cooling water and said refrigerant is conducted when said inside heat-exchanger functions as a condenser.

13. The method for stable operation of the heat pump apparatus according to claim 7, wherein said cooling water circulation line is composed of a first channel forming a closed loop through said engine, a second channel forming a closed loop through said engine and a radiator for cooling said cooling water, and a third channel forming a closed loop through said engine and said cooling water-refrigerant heat-exchanger, in which the quantity of heat exchanged at said cooling water-refrigerant heat-exchanger is controlled by adjusting the quantity of each cooling water circulating through said respective three channels.

* * * * *